Figure 1:
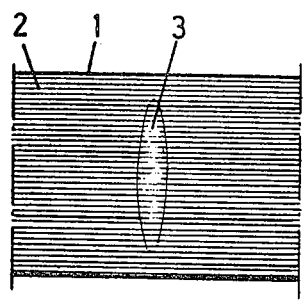

United States Patent [19]

Sundqvist

[11] 4,379,599
[45] Apr. 12, 1983

[54] BEARING INNER RING

[75] Inventor: Yngve Sundqvist, Partille, Sweden

[73] Assignee: SKF Industries, Inc., King of Prussia, Pa.

[21] Appl. No.: 221,018

[22] Filed: Dec. 29, 1980

[30] Foreign Application Priority Data

Jan. 28, 1980 [SE] Sweden .............................. 8000631

[51] Int. Cl.³ ........................ F16C 33/58; F16C 33/66
[52] U.S. Cl. .................................. 308/187; 308/241; 29/148.4 R; 51/291
[58] Field of Search .............. 308/187, 188, 216, 241; 51/291; 29/184.4 R

[56] References Cited

U.S. PATENT DOCUMENTS

| 1,139,192 | 5/1915 | King ...................................... 308/216 |
| 2,187,471 | 1/1940 | Hutchinson ............................ 51/291 |
| 2,460,472 | 1/1949 | Seyferth ................................ 51/291 |
| 4,048,764 | 9/1977 | Schmitz ................................. 51/291 |

FOREIGN PATENT DOCUMENTS

| 209101 | 3/1925 | United Kingdom ................ 308/188 |
| 250412 | 4/1926 | United Kingdom ........... 29/148.4 R |

Primary Examiner—Richard R. Stearns
Attorney, Agent, or Firm—Eugene E. Renz, Jr.

[57] ABSTRACT

The invention concerns an inner ring for a rolling bearing provided with a raceway for co-operation with a number of rolling bodies. In order to improve the bearing lubrication properties, the raceway is provided with grooves extending across the raceway with a direction component parallel to the bearing axis.

2 Claims, 6 Drawing Figures

U.S. Patent    Apr. 12, 1983    4,379,599

BEARING INNER RING

The invention concerns an inner ring for a rolling bearing provided with a raceway for co-operation with a number of rolling bodies. The lubrication conditions are very important for the function of a rolling bearing. A thin lubricant layer between the rolling bodies and the raceways which prevents metallic contact gives the best possible running conditions. If the amount of lubricant in the bearing is insufficient for such a layer to be established, the bearing will be worn out and fail in a short time. If instead the amount of lubricant is greater than necessary, the bearing friction is unnecessarily high, with energy losses and sometimes a dangerous temperature rise as a consequence. It is thus desirable to use the smallest possible amount of lubricant and at the same time secure a proper lubrication. With a given amount of lubricant it is more difficult to secure a proper lubricant layer in the contact between a rolling body and a raceway with a convex circumference, i.e. a raceway in the inner ring, than between the rolling body and a raceway with a concave circumference, i.e. a raceway in the outer ring. The inner ring lubrication is thus critical.

The object of the present invention is to provide a bearing with an inner ring raceway which is so arranged that the development of a lubricant film between rolling body and raceway is facilitated, whereby the lubrication of the bearing is improved so that the smallest possible amount of lubricant can be used.

This is achieved according to the invention by arranging the inner ring as specified in the characterizing clause of the appended claim 1.

Inner rings according to the invention can be manufactured by grinding and/or polishing the raceways in a suitable way.

Grinding of outer ring raceways in a manner which results in grinding grooves extending across the raceway is not new. However, this grinding procedure is not used for the purpose of improving the lubrication properties, which is obvious from the fact that the outer ring lubrication is not critical, as mentioned above. Instead, the direction of the grinding grooves is the accidental result of the use of a grinding procedure which is suitable for grinding outer ring raceways.

Figure 2:
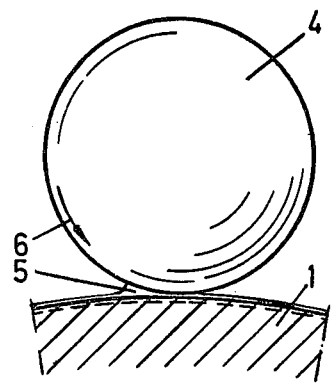
Figure 3:
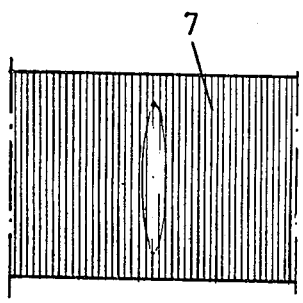
Figure 4:
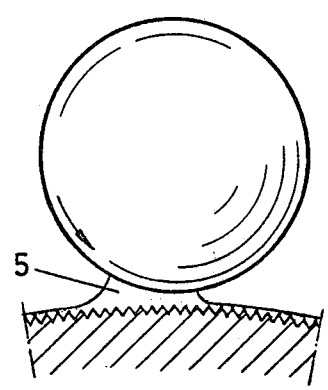
Figure 5:
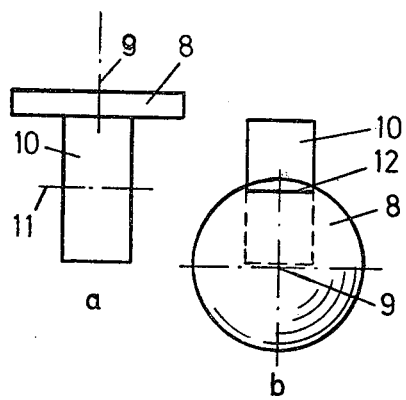
Figure 6:
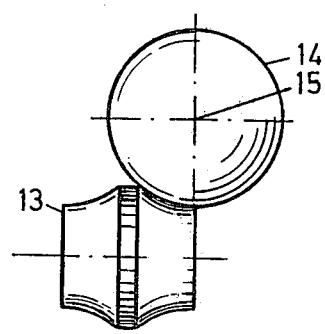

The following is a closer description of the invention with reference to the accompanying drawing, in which FIG. 1 shows a portion of an inner ring raceway extended in a plane, in which the conventional surface structure of the raceway is shown, FIG. 2 shows the rolling contact in this case, FIGS. 3 and 4 show corresponding features according to one embodiment of the invention, and FIGS. 5 and 6 show different methods of giving the raceways a desired shape in the grinding procedure.

FIG. 1 shows in great exaggeration the extension of the grinding grooves 2 in a conventional inner ring raceway 1 extended in a plane. The grooves run in the circumferential direction of the raceway, since the grinding generally takes place with the periphery of a grinding wheel which has its axis in the same plane as the bearing axis. The surface 3 indicates the contact between the raceway and a loaded rolling body. After a normal raceway grinding operation, the depth of the grinding grooves 2 is about 0.1 $\mu$m and depending on the grade of the grinding wheel and the performance of the grinding operation.

FIG. 2 shows in a section how a rolling body 4 contacts the raceway 1 of an inner ring. The grinding grooves in the raceway extend as shown by the dotted line. A lubricant 5 forms a layer between the rolling body and the raceway. The rolling body is supposed to rotate in the direction of the arrow 6. Since the grooves extend in the rolling direction, the lubricant tends to be drained from the rolling contact so that the lubricant layer is thinned, which creates a risk for metallic contact to be established between the rolling body and the raceway.

FIG. 3 shows in a manner corresponding to FIG. 1 the shape of a raceway of an inner ring according to the invention. The raceway has grooves 7, e.g. grinding grooves, which extend across the raceway with a direction component parallel to the bearing axis.

FIG. 4 corresponds to FIG. 2 and shows that the direction of the grooves in relation to the rolling body prevents the lubricant 5 from leaving the rolling contact area, since the grooves act as dams instead of draining channels, which means that the lubricant layer can be kept comparatively thick also if the amount of lubricant in the bearing is small. The risk for metallic contact to be established between the rolling body and the raceway is consequently also small. If the grooves are about perpendicular to the circumferential direction of the raceway, as shown in FIG. 3, maximum improvement of the bearing lubrication is obtained, but also grooves running obliquely over the raceway are effective. The angle between the grooves and the circumferential direction of the raceway should, however, be greater than 45°.

The grooves may be obtained in a number of different ways. They are suitably created during grinding of the inner ring raceway. A grinding wheel of normal grade for use in raceway grinding gives grinding grooves with a depth of about 0.1 $\mu$m and a mutual groove distance which is less than one hundredth of a rolling body diameter for all normal rolling body sizes, which is suitable for obtaining the desired effect.

FIG. 5 shows in principle how grinding of an inner ring raceway in a cylindrical roller bearing can be carried out in order to obtain a raceway according to the invention.

FIGS. 5a and 5b are views in two perpendicular planes. A grinding wheel 8 rotating about the axis 9 contacts, with one of its end planes, the envelope surface of a ring 10 which rotates about the axis 11. The contact is principally a line contact as shown with the line 12. If the rotation of the grinding wheel is fast in relation to the rotation of the ring and the contact 12 is situated close to the periphery of the grinding wheel, the grinding grooves will be almost perpendicular to the direction of the circumference of the raceway on the ring.

FIG. 6 shows how a raceway with an arcuate profile can be ground so that a raceway according to the invention is obtained. An inner ring 13 for a double row spherical roller bearing is shown as an example. The raceway is ground by the grinding wheel 14 which rotates about the axis 15 and contacts the raceway with its periphery. Also in this embodiment the grinding grooves will be almost perpendicular to the circumferential direction of the raceway if the grinding wheel rotates fast in comparison to the inner ring during grinding.

The invention is not limited to the above described embodiments. It may also be used for e.g. ball bearing inner rings, and the grooves can be provided in a number of different ways.

I claim:

1. An inner ring for a rolling bearing having at least one raceway, a plurality of rolling elements travelling in a predetermined direction relative to said raceway, means defining a plurality of closely spaced grooves which extend over substantially the entire raceway surface substantially transversely to said predetermined direction of the rolling elements, said grooves being formed by a grinding operation on said inner raceway surface and the spacing between adjacent grooves being less than about one hundredth the diameter of a rolling element, said grooves operable to retain a lubricant therein and form a layer or film between the raceway and the rolling elements.

2. A ring for rolling bearings as claimed in claim 1 wherein said grooves have a depth of approximately 0.1 μm.

* * * * *